US006164835A

United States Patent [19]

Imasaki

[11] Patent Number: 6,164,835

[45] Date of Patent: Dec. 26, 2000

[54] SPLIT SLEEVE FOR OPTICAL CONNECTORS

[75] Inventor: Katsuhiro Imasaki, Kyoto, Japan

[73] Assignee: Suncall Corporation, Kyoto-fu, Japan

[21] Appl. No.: 09/165,299

[22] Filed: Oct. 2, 1998

[51] Int. Cl.[7] ..... G02B 6/38

[52] U.S. Cl. ..... 385/72; 385/70; 385/55

[58] Field of Search ..... 385/70, 72, 73, 385/74, 55

[56] References Cited

U.S. PATENT DOCUMENTS

| | | | |
|---|---|---|---|
| 5,142,601 | 8/1992 | Shibata et al. | 385/86 |
| 5,282,259 | 1/1994 | Grois et al. | 385/84 |
| 5,577,145 | 11/1996 | Musk | 385/88 |

FOREIGN PATENT DOCUMENTS

| | | |
|---|---|---|
| 7-244226 | 9/1995 | Japan . |

*Primary Examiner*—Rodney Bovernick
*Assistant Examiner*—Michael J. Stahl
*Attorney, Agent, or Firm*—Arent Fox Kintner Plotkin & Kahn, PLLC

[57] ABSTRACT

A split sleeve 1 for optical connectors is provided, which may be constructed from a single part with a reduced cost and which permits retention forces on larger and smaller ferrules to be easily adjusted in uniform manner. The split sleeve 1 includes a cylindrical member made from a metallic material, such as phosphor bronze or stainless steel, representing an appropriate spring-back action. A slit is extended in the axial direction from one end to the other end of the cylindrical member. One end portion 1*a* of the cylindrical member on one side of an intermediate portion is configured to have a larger diameter, while the other end portion 1*b* of the cylindrical member on the other side of the intermediate portion is configured to have a smaller diameter.

1 Claim, 1 Drawing Sheet

1
1b
1a
2
1c

SPLIT SLEEVE FOR OPTICAL CONNECTORS

FIELD OF THE INVENTION

The present invention relates to a split sleeve for optical connectors. More particularly, the invention relates to a deformed split sleeve of an integral construction by which a pair of ferrules having a different outer diameter may be held coaxially in alignment with each other.

BACKGROUND OF THE INVENTION

In optical connection using an optical adapter, a pair of ferrules having the same diameter are connected together in a form of butt joint. It is noted, however, that the standards in Japan and outside Japan for optical connectors with regard to their shapes and sizes have not yet been unified. Thus, it is sometimes necessary for a pair of ferrules of a different diameter, for example, one being of a SC type optical connector and the other being of a miniature SC type optical connector, to be connected together.

A sleeve for an optical connector for holding a pair of ferrules of a different diameter together in a coaxial fashion is disclosed, for example, in Japanese Utility Model Public Disclosure No. (Hei)03-65106 and Japanese Patent Public Disclosure No. (Hei)05-88044. The sleeve S disclosed therein includes, as shown in FIG. 3, a split sleeve 10 and a cylindrical body 11 which are inter-fitted with each other. The split sleeve 10 is finished on its inner diameter by means of precision grinding. The cylindrical body 11 is finished on its inner and outer diameters by means of precision grinding. The sleeve S is fitted into a connector housing of a cylindrical configuration and fixed therein. An optical connector having a ferrule of a larger diameter is inserted into the split sleeve 10 from the left-hand side as viewed in FIG. 3. Another optical connector having a ferrule of smaller diameter is inserted into the cylindrical body 11 from the right-hand side as viewed in FIG. 3. Each optical connector is anchored to the connector housing by means of a hook provided at each end of the connector housing.

SUMMARY OF THE INVENTION

As mentioned above, the conventional sleeve S for an optical connector is constructed by the split sleeve 10 and the cylindrical body 11 which should be inter-fitted with each other in a coaxial fashion with a predetermined precision. Thus, it is difficult for the parts of such sleeve to be reduced in cost. It is specifically noted that the cylindrical body 11 requires a significant machining cost, since it should be finished precisely on its inner and outer peripheries by means of grinding.

It is also noted that the prior art sleeve S for optical connectors includes two parts to be interfitted with each other. This essentially causes an overlap portion between the two parts. Thus, the overlap portion tends to exert a retention force on the corresponding portion of a ferrule which is larger than that in the remaining portions. It is, therefore, difficult to provide an even retention force on the ferrules. Specifically, it is likely that an excessive or insufficient retention force is applied to one or the other ferrule.

It is, therefore, a main object of the invention to provide a split sleeve for optical connectors which may be constructed from a single part with a reduced cost and which permits retention forces on larger and smaller ferrules to be easily adjusted in uniform manner.

In order to achieve the above object, the invention provides a split sleeve for optical connectors which comprises one end portion and the other end portion disposed respectively on axially opposite sides of an intermediate portion, the one end portion having a larger diameter and the other end portion having a smaller diameter, and a slit extending from one end to the other end of the split sleeve in the axial direction.

When a split sleeve for optical connectors is used, a pair of ferrules respectively of a larger diameter and a smaller diameter are automatically aligned with each other in a coaxial relationship when the pair of ferrules are simply inserted into the split sleeve. It is also noted that the ferrules of a larger diameter and a smaller diameter may be securely retained in the split sleeve by means of a common spring-back action due to the integral construction of the split sleeve, whereby retention forces on the ferrules may be easily adjusted.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENTS

Figure 1:
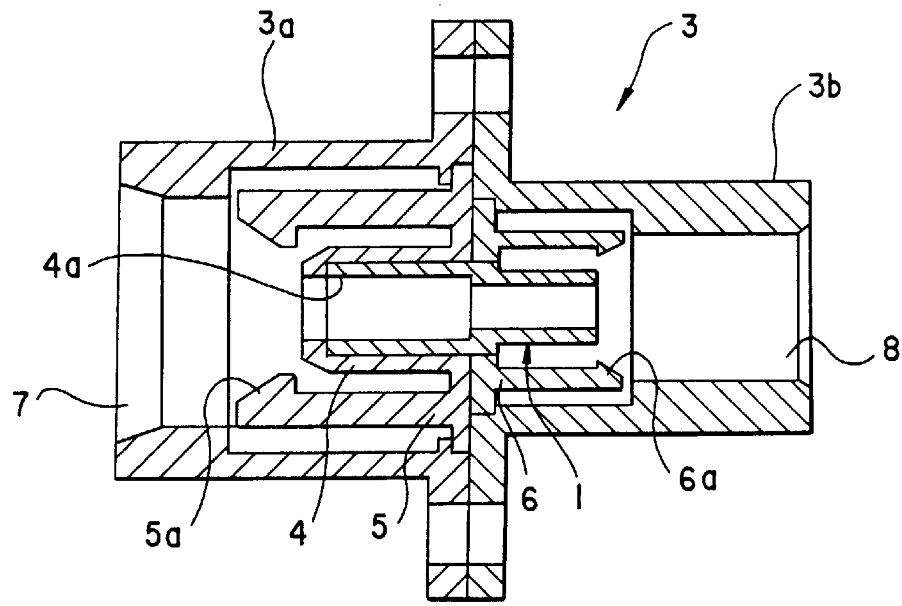
FIG. 1 is a cross-sectional view of an adapter housing in which a split sleeve for optical connectors according to the invention is incorporated.
Figure 2:
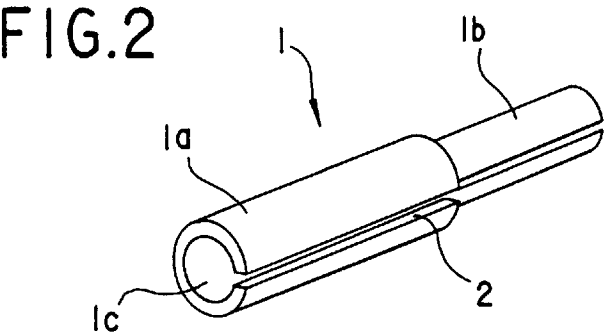
FIG. 2 is a perspective view of the split sleeve for optical connectors in accordance with the invention.
Figure 3:
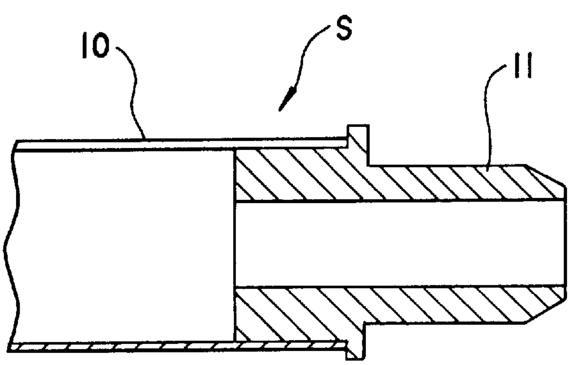
FIG. 3 is a cross-sectional view of a sleeve for optical connectors in prior art.

One embodiment of the invention will be explained in detail below with reference to the drawings. A split sleeve 1 for optical connectors in accordance with the invention includes, as shown in FIGS. 1 and 2, a cylindrical body formed with a slit 2 extending in the axial direction. The split sleeve 1 includes one end portion on one side of the intermediate portion and the other end portion on the other side of the intermediate portion. In this connection, it is to be noted that the "intermediate portion" mentioned above means a portion disposed at a given position between the one end portion and the other end portion. The one end portion of the split sleeve 1 constitutes a diametrically larger portion 1*a,* while the other end portion of the split sleeve 1 constitutes a diametrically smaller portion 1*b*. The inner periphery 1*c* of each of the diametrically larger portion 1*a* and the diametrically smaller portion 1*b* of the split sleeve 1 is finished by means of precision grounding. The axes of the diametrically larger portion 1*a* and the diametrically smaller portion 1*b* are coaxially aligned with each other to a degree of high precision.

It is preferable to use as a material for the split sleeve 1 a metal, such as phosphor bronze, stainless steel or the like, having an appropriate resiliency for causing a spring-back action of the split sleeve 1 in the circumferential direction. Zirconia ceramic, conventionally used in manufacturing a sleeve for optical connectors in prior art, may, of course, be used in the present invention. It is noted, however, that it is convenient for the split sleeve in accordance with the invention to be manufactured from metallic materials for the purpose of reducing the manufacturing cost.

The split sleeve 1 constructed as mentioned above is fitted, in its entirety, into an adapter housing 3 of a cylindrical configuration and fixed therein. The adapter housing 3 includes a pair of left-hand side and right-hand side housing halves 3*a* and 3*b*. The pair of housing halves 3*a* and 3*b* are integrally connected by means of a flange portion. The split sleeve 1 according to the invention is fitted within an axially extending, cylindrical portion 4 of the housing halve 3*a*. The axially extending, cylindrical portion 4 is formed, on the inner periphery of its forward end portion, with a shoulder portion 4*a*. The shoulder portion 4*a* is adapted to be engaged, in an abutment relationship, with one end of the diametrically larger portion 1*a* of the split sleeve 1. The remaining portions of the housing adapter 3 are substantially the same as those of the prior art adapter housing as disclosed in the above-mentioned Public Disclosures. Specifically, the housing adapter 3 includes, for example, a larger inter-fitting sleeve 5 having a hook 5*a* and a smaller inter-fitting sleeve 6 having a hook 6*a*. A pair of ferrules (not shown), respectively having a larger diameter and a smaller diameter, are inserted respectively through left-hand and right-hand side insert holes 7 and 8. The ferrule of a larger diameter is fitted within the diametrically larger portion 1*a* of the split sleeve 1, while the ferrule of a smaller diameter is fitted within the diametrically smaller portion 1*b* of the split sleeve 1. Connectors of the ferrules are engaged respectively with the hooks 5*a* and 6*a*, whereby the connectors are secured to the housing 3.

In accordance with the invention, a sleeve for optical connectors is constructed by a split sleeve of an integral construction including a diametrically larger portion and a diametrically smaller portion, as mentioned above. In this manner, the sleeve is constructed form a single part, so that its construction may be simplified. The sleeve has no inter-fitting parts which require precise grinding or machining, whereby manufacturing cost may be reduced. It is also noted that the split sleeve is of an integral construction, so that the ferrules of larger and smaller diameters may be securely retained by means of a common spring-back action. Thus, retention forces on both ferrules may be adjustably optimized.

It will further be obvious to those skilled in the art that many variations may be made in the above embodiments, here chosen for the purpose of illustrating the present invention, and full result may be had to the doctrine of equivalents without departing from the scope of the present invention, as defined by the appended Claim.

What is claimed is:

1. A split sleeve for optical connectors comprising:

a first end portion disposed at a first end of the split sleeve;

a second end portion disposed at an axially opposite end of the split sleeve;

an intermediate portion located between the first and second end portions, wherein the first end portion has a larger diameter than the second end portion; and a slit extends from the first end portion to the second end portion in an axial direction, wherein the split sleeve connects a first ferrule and a second ferrule having a diameter smaller than a diameter of the first ferrule, and a first inner circumference of the first end portion holds the first ferrule therein and a second inner circumference of the second end portion holds the second ferrule therein.

* * * * *